US012762982B2

(12) United States Patent
Nelsen et al.

(10) Patent No.: US 12,762,982 B2
(45) Date of Patent: Oct. 13, 2026

(54) TECHNIQUES FOR DYNAMIC CONTROL OF COLOR ABSORPTION FOR DISPLAY DEVICES

(71) Applicant: Microsoft Technology Licensing, LLC, Redmond, WA (US)

(72) Inventors: Phillip Nelsen, Kirkland, WA (US); Poon Yarn Chee, Redmond, WA (US); Seungwoo Lee, Bothell, WA (US); Chang Joon Park, Sunnyvale, CA (US); Michael Shi, Camano Island, WA (US); Sammy Lee, Bellevue, WA (US); Justin Yuyang Ye, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 19/043,270

(22) Filed: Jan. 31, 2025

(65) Prior Publication Data

US 2026/0229157 A1 Aug. 6, 2026

(51) Int. Cl.

| | |
|---|---|
| ***G02B 27/01*** | (2006.01) |
| ***G09G 3/20*** | (2006.01) |
| ***G09G 3/30*** | (2006.01) |
| ***G09G 3/36*** | (2006.01) |

(52) U.S. Cl.

CPC ....... *G09G 3/2003* (2013.01); *G02B 27/0172* (2013.01); *G09G 2320/0233* (2013.01); *G09G 2320/0242* (2013.01); *G09G 2320/0653* (2013.01); *G09G 2360/144* (2013.01); *G09G 2360/16* (2013.01)

(58) Field of Classification Search

CPC ....... G02B 27/0172; G09G 2320/0242; G09G 2360/144

See application file for complete search history.

(56) References Cited

U.S. PATENT DOCUMENTS

| | | | | |
|---|---|---|---|---|
| 2007/0097478 | A1* | 5/2007 | Baliga | G02F 1/1334 359/246 |
| 2012/0154627 | A1* | 6/2012 | Rivard | H04N 23/88 348/E9.051 |
| 2016/0154269 | A1* | 6/2016 | Fukuoka | G09G 3/34 345/87 |
| 2019/0284473 | A1* | 9/2019 | Jain | G02F 1/3556 |
| 2023/0418104 | A1* | 12/2023 | Wu | G02F 1/133603 |

OTHER PUBLICATIONS

Naveen Raj; "LCD Biasing and Contrast Control Methods", 2012 Microchip Technology Inc., pp. 1-22.

2023 Robert Bosch GmbH; "Safe eyes save lives: How Bosch engineers are innovating the 95-year-old sun visor" retrieved: https://www.bosch-mobility.com/en/company/current-news/how-bosch-innovates-the-sun-visor/ Jan. 31, 2025.

* cited by examiner

*Primary Examiner* — Sanghyuk Park

(74) *Attorney, Agent, or Firm* — ArentFox Schiff LLP

(57) ABSTRACT

Described are examples for controlling a chromatically adaptive film for a display device. An indication of one or more colors for absorption by the chromatically adaptive film can be received. Based on the indication, light transmittance in one or more color absorptive layers of multiple color absorptive layers of the chromatically adaptive film can be modified.

20 Claims, 6 Drawing Sheets

500

| Target CR : >5:1 | | E.g 20% considered OFF | | |
|---|---|---|---|---|
| Ambient lux | ALS (example signal below) | Dimming Setting (% Transmission) | Display Brightness | Hologram CR |
| 500 | 0.5 | 20 | 150 | 5.7 |
| 2000 | 2 | 20 | 600 | 5.7 |
| 5000 | 5 | 12 | 800 | 5.2 |
| 10000 | 10 | 6 | 800 | 5.2 |
| 20000 | 20 | 3 | 800 | 5.2 |
| 50000 | 50 | 1 | 800 | 6.0 |
| >50000 | > 50 | 1 | 800 | <6 |

502

| Target CR :> 3:1 | | | | |
|---|---|---|---|---|
| Ambient lux | ALS (example signal below) | Dimming Setting (% Transmission) | Display Brightness | Hologram CR |
| 500 | 0.5 | 20 | 100 | 4.1 |
| 2000 | 2 | 20 | 400 | 4.1 |
| 5000 | 5 | 12 | 500 | 3.6 |
| 10000 | 10 | 6 | 500 | 3.6 |
| 20000 | 20 | 3 | 500 | 3.6 |
| 50000 | 50 | 1 | 500 | 4.1 |
| >50000 | > 50 | 1 | 500 | <4 |

Figure 5

TECHNIQUES FOR DYNAMIC CONTROL OF COLOR ABSORPTION FOR DISPLAY DEVICES

BACKGROUND

Mixed reality (MR) devices include a wearable display device having a display that allows transmission of ambient light to facilitate viewing an environment outside of the wearable display device while also allowing for displaying images over the environment. MR devices are increasing in demand and are usable for a multitude of applications, such as gaming, education, simulation, and the like. MR devices may include brightness control or backlighting to adjust a contrast ratio of the display to account for high levels of ambient light, where a higher contrast ratio may improve the viewability of the images on the display. Wearable MR devices, however, may be susceptible to power limitations due to their small form factor design, and increasing brightness or backlighting in this regard may have a significant impact on the power consumption, and thus battery life, of wearable MR devices. In addition, the wearable MR devices using a single layer for controlling light transmittance may be limited on controlling low levels of light transmittance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an apparatus for controlling a chromatically adaptive film for a display device is provided that includes one or more processors configured to receive an indication of one or more colors for absorption by the chromatically adaptive film, and modify, based on the indication, light transmittance in one or more color absorptive layers of multiple color absorptive layers of the chromatically adaptive film.

In another example, a method for controlling a chromatically adaptive film for a display device is provided that includes receiving an indication of one or more colors for absorption by the chromatically adaptive film, and transmitting a power control signal to each of one or more color absorptive layers of multiple color absorptive layers of the chromatically adaptive film to modify, based on the indication, light transmittance in the one or more color absorptive layers.

In another example, a non-transitory computer-readable device is provided that stores instructions thereon that, when executed by a computing device, cause the computing device to perform operations for controlling a chromatically adaptive film for a display device including receiving an indication of one or more colors for absorption by the chromatically adaptive film, and transmitting a power control signal to each of one or more color absorptive layers of multiple color absorptive layers of the chromatically adaptive film to modify, based on the indication, light transmittance in the one or more color absorptive layers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is an example of look-up tables for mapping an amount of ambient light to a dimming setting and/or display brightness for a display device, in accordance with aspects described herein.

DETAILED DESCRIPTION

Figure 1:
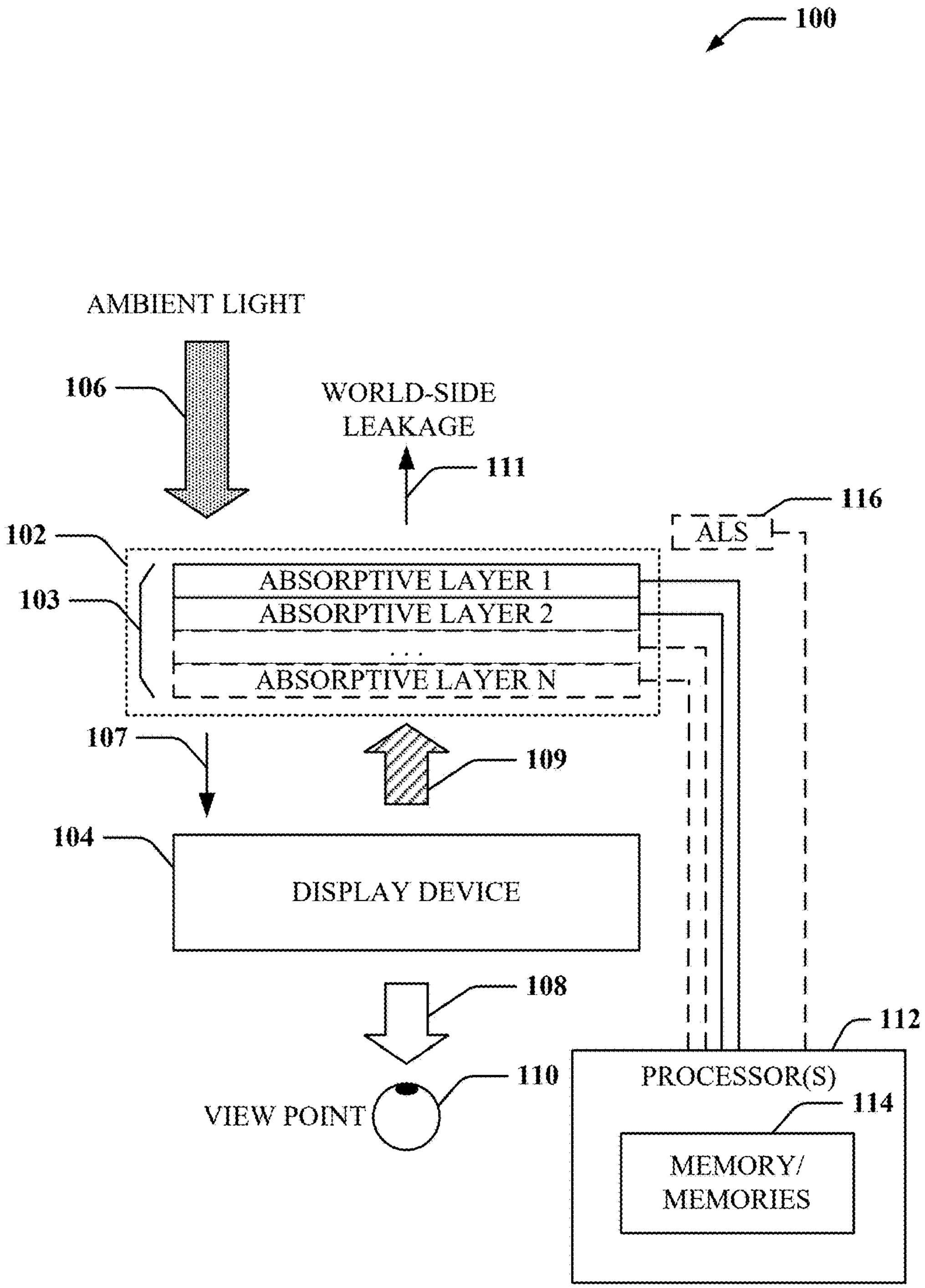
FIG. 1 is a system level block diagram of an example of a system that includes or can use a chromatically adaptive film for dynamically absorbing color from light transmittance relative to a display device, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to controlling color absorption to achieve a level of light transmittance relative to a display device. In an example, chromatically adaptive film is provided that includes multiple independently controllable layers that can each be selectively controlled to absorb all or a given portion of one color of a plurality of different colors from light transmittance relative to the display device, respectively limiting the light transmittance for each color of the plurality of different colors. The light transmittance absorbed by the layers can include ambient light from the outside world directed to the display and/or world-side leakage from the display directed to the outside world. In an example, a chromatically adaptive film is provided that can be situated adjacent to and/or as a layer of a display device to control color-specific light transmittance of multiple colors to the display device. The chromatically adaptive film can achieve independent color absorption of a controllable amount of one or more colors of the multiple colors by using multiple absorptive layers, each specific to one of the multiple colors. A processor (or a plurality of processors) can send power signals to one or more of the color-specific layers of the multiple layers of the chromatically adaptive film to selectively activate or deactivate absorption of a corresponding one or more colors, and/or to facilitate controlling an amount of color absorption through each of the one or more color-specific layers, etc. Each layer can include one or more electrodes for receiving the power signals to activate or deactivate an amount of color absorption.

For example, the chromatically adaptive film can include a layer for each primary color wavelength used by the display device to display images. In one specific example, the chromatically adaptive film can include a layer for red color, a layer for green color, and a layer for blue color. Each layer can include a dielectric liquid crystal (LC) layer composed of an absorptive dye that can be activated by sending a power signal (e.g., voltage) to one or more electrodes coupled to the layer, and the amount of voltage can control, or correlate to, the amount of absorption of the specific color to be applied for the given layer. In an example, the chromatically adaptive film can be controlled based on receiving an indication of one or more colors for absorption by the chromatically adaptive film. For example, the indication can correspond to one or more selectable absorption level parameters (e.g., a configurable setting for absorbing a controllable amount of one or more colors associated with each layer), an image being displayed on a display device associated with the chromatically adaptive film, and/or an amount and/or color(s) of ambient light being transmitted through the display device associated with the chromatically adaptive film.

Using the chromatically adaptive film with multiple layers can enable achieving lower levels of light transmittance through a display device by independently controlling an amount of light transmittance of individual color wavelengths used by the display device to display images. In addition, using chromatically adaptive film can facilitate improving observable image quality or contrast in certain lighting conditions, by absorbing (or allowing more transmittance of) ambient light that is the same or similar color as an image being displayed on the display device. Further, using chromatically adaptive film can decrease world-side leakage of color-specific light transmittance by the display device when displaying images at a certain brightness level. In addition, using chromatically adaptive film may allow for improved power consumption by allowing absorption of certain ambient light to facilitate improving observable image quality or contrast without having to increase a brightness level on the display device. Reducing the increase in brightness level in this regard can provide further reduction in world-side leakage that may otherwise result from displaying the image by the display device.

In one implementation, which should not be construed as limiting, the chromatically adaptive film may be in the form of a detachable visor for a heads up display system (HUD). The chromatically adaptive film has three separate liquid crystal layers laminated to a plastic substrate. Each layer has a different absorptive dye targeted for different ranges of the visible light spectrum, such as: a blue absorptive dye, a green absorptive dye, and a red absorptive dye. In this implementation, a user can adjust the transmitted color of the light entering the HUD, and thus the user will be able to tune the perceived color to enhance the contrast of objects seen through the HUD.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a system level block diagram of an example of a system 100 that includes or can use a chromatically adaptive film 102 for dynamically absorbing a controllable amount of one or more colors from light transmittance relative to a display device 104, in accordance with aspects described herein. For example, chromatically adaptive film 102 can be overlaid on or within the display device 104, as depicted, integrated within the display device 104 (e.g., as one or more layers of the display device 104), and/or the like. The chromatically adaptive film 102 can provide color absorption between ambient light 106 and a user viewing output from the display device 104. In this regard, a portion of the ambient light 106 can be at least partially absorbed by one or more absorptive layers 103 in the chromatically adaptive film 102, which can affect the light transmittance of the ambient light 106 to yield filtered ambient light 107 on or through the display device 104 to a view point 110 (e.g., the eyes of a user viewing the display device 104). In another example, display device 104 can produce display light 108 when displaying images for viewing at the view point 110 (e.g., by a user viewing output from the display device 104 at the viewing point 110). In this example, the chromatically adaptive film 102 can provide color absorption between leakage light 109 produced from the display light 108 in a direction of the world outside of the display device 104 (e.g., light leaked in a direction other than towards the view point 110). In this regard, a portion of the leakage light 109 can be at least partially absorbed by one or more absorptive layers 103 in the chromatically adaptive film 102, which can affect the light transmittance of the leakage light 109 to yield filtered (e.g., reduced) world-side leakage 111 to the outside world.

In examples described herein, an amount of light transmittance of the ambient light 106 or the leakage light 109 can be controllably modified by a selected one or more layers of the one or more absorptive layers 103, where each of the one or more absorptive layers 103 can absorb a different color from the ambient light 106 or leakage light 109. While FIG. 1 illustrates the one or more absorptive layers 103 between the ambient light 106 and the display device 104, or between the display device 104 and the outside world, in some examples, the one or more absorptive layers 103 can be on the other side of the display device 104, within the display device 104, etc., or a first set of layers of the one or more absorptive layers 103 can be on a first side of the display device 104 or within the display device 104, etc., while a second set of the one or more absorptive layers 103 can be on a second side of the display device 104 or within the display device 104, etc. In some examples, the chromatically adaptive film 102 may be deployed within the display device 104 on one side of lens or waveguide thereof (e.g., between the ambient light 106 and the lens or waveguide, between the lens or waveguide and a display projecting images to the lens or waveguide, etc.).

The chromatically adaptive film 102 can include multiple absorptive layers 103 (e.g., absorptive layer 1, 2, . . . . N), where at least two of the multiple absorptive layers correspond to a different color. For example, the at least two of the multiple absorptive layers can use different color dyes to provide the color absorption. In one specific example, each absorptive layer in the multiple absorptive layers 103 can correspond to a different color, such as the primary color wavelengths used in the display of the display device 104 (e.g., a red absorptive layer, a green absorptive layer, and a blue absorptive layer for a red, green, blue (RGB) display). For example, the LC and/or dye in each absorptive layer can be activated by an applied voltage to cause absorption, where the level of absorption can be a function of the applied voltage. In another example, the chromatically adaptive film 102 can include a single absorptive layer with multiple color dyes (e.g., a red dye, a green dye, and a blue dye in a single layer). In this example, the multiple color dyes can be activated by an applied voltage to cause absorption.

In a specific example, the chromatically adaptive film 102 is provided for the display included in or forming the display device 104 as an MR device, or other heads-up display (HUD), or Augmented Reality (AR) Goggle and Glass formfactor. For example, the MR device can be worn by a user for viewing ambient light outside of the MR device, e.g., a real world environment or "reality," and also images displayed by a display in the MR device in addition to the ambient light, which can provide a holographic effect of the image being displayed over reality viewed outside of the MR device. In this example, the chromatically adaptive film 102 can be overlaid on the display of the MR device (e.g., between a lens of the MR device and the display) or at substantially any layer between the ambient light 106 and the view point 110 (e.g., eyes of a user of the MR device) to allow for modifying a transmittance of the ambient light through the display of the MR device. Similarly, in an example, the chromatically adaptive film 102 can be overlaid on the display of the MR device (e.g., between the lens of the MR device and the display) or at substantially any layer between the leakage light 109 and the outside world to allow for modifying a transmittance of the leakage light 109 from the display to the outside world.

In one example, the chromatically adaptive film 102 may include multiple segments at each absorptive layer 103, which can be independently controllable to provide absorption within the specific segment at each absorptive layer, which can provide additional power savings, as less voltage may be required to activate a segment of a given absorptive layer 103 rather than the entire absorptive layer 103. In this regard, for example, activation of a given segment or segments of each of the absorptive layers 103 may be based on the displayed image (e.g., based on a position of an object in the image displayed by the display device 104) to ensure the light transmittance is affected for an area of the image (or a certain object in the image). For example, absorption may be applied to only a segment or segments corresponding to where the image is displayed, or such sections may have additional weight applied for absorbing color as compared to other segments in the absorptive layer 103 (e.g., the chromatically adaptive film 102 may darken an area with an image, with lesser/different darkening than that applied to other segments). In a specific example, given an area used to display a rectangular map overlay on the display device 104, chromatically adaptive film 102 can be controlled (e.g., by MCU 208 based on input from display device 104 regarding an image being displayed) to dim the colors for the area of that rectangular map overlay based on the colors used in that map overlay. Specifically, for example, chromatically adaptive film 102 can be controlled to activate absorption in one or more sections of each of the one or more color absorptive layers 103 for dimming those map overlay-based colors on respective segments of the one or more color absorptive layers 103. This can additionally reduce world-side leakage of the image.

In an example, the chromatically adaptive film 102 can be a separate device with its own processing capabilities (e.g., and thus may include one or more processors 112 or memory/memories 114) to provide selective color absorption of ambient light 106 transmitted towards the MR device. In another example, the chromatically adaptive film 102 can be integrated within the display device 104 (e.g., MR device) and its processing capabilities can be used to provide the color absorption, as described herein (e.g., the processor(s) 112 and memory/memories 114 can be that of the display device 104).

In an example, the chromatically adaptive film 102 or associated processor(s) 112, may include, or may otherwise be communicatively coupled with, one or more sensors, such as an ambient light sensor (ALS) 116. The processor(s) 112 can receive input data from the ALS 116 and can control the color absorption at one or more of the one or more absorptive layers 103 based on the input data. For example, the processor(s) 112 can determine an amount of color absorption to apply to one or more of the absorptive layers 103 based on the amount of ambient light, a color profile of the ambient light, etc. to achieve a contrast ratio. For example, the color profile of the ambient light can include an amount of red, green, and blue color (or substantially any combination of colors that can correlate to the colors of the one or more absorptive layers 103) in the ambient light 106. In one example, the processor(s) 112 can determine the amount of color absorption to apply for the one or more absorptive layers 103 further based on one or more selectable absorption level parameters (e.g., a selectable absorption level parameter for each absorptive layer), which a user can configure through software, a hardware switch on, or associated with, the chromatically adaptive film 102 or display device 104, etc.

As noted above, the chromatically adaptive film 102 may also include, or may otherwise be communicatively coupled with, one or more processors 112 and/or a memory/memories 114 for providing functionality described herein. For example, the memory/memories 114 can include instructions for, and/or processor(s) 112 can execute, function described herein such as sending signals to one or more absorptive layers 103 in the chromatically adaptive film 102, operating or communicating with the ALS 116 to receive input data, and/or the like. In one example, the processor(s) 112 and/or memory/memories 114 can execute instructions to receive or measure an amount, or color profile, of ambient light from the ALS 116, receive information regarding an amount or color profile used by display device 104 to display an image, etc. The processor(s) 112 and/or memory/memories 114 can execute instructions to activate one or more absorptive layers 103 in the chromatically adaptive film 102 to absorb color in the ambient light, or to absorb color in leakage light 109. In addition, as the amount, or color profile, of ambient light changes, the processor(s) 112 and/or memory/memories 114 can execute instructions to increase or decrease the amount of color absorption by one or more absorptive layers 103 in the chromatically adaptive film 102 to account for the amount, or color profile, of ambient light or leakage light. In an example, the processor(s) 112 can also be communicatively coupled with the display device 104, and can adjust a brightness level of the display device 104 based on the amount of color absorption being applied and/or based on the ambient light amount, or color profile, detected by the ALS 116.

In an optional or additional aspect, which may be combined with any of the above-described features, the processor(s) 112 and/or memory/memories 114 can include and/or can be configured to execute instructions to generate and display an image on the display device 104. For example, the instructions may be a mixed reality program, and the image may be used to create a mixed reality scene on the display when a user is viewing a real world environment through the display device 104. In other words, the processor(s) 112 and/or memory/memories 114 can be configured to implement the display device 104 as a MR device.

Figure 2:
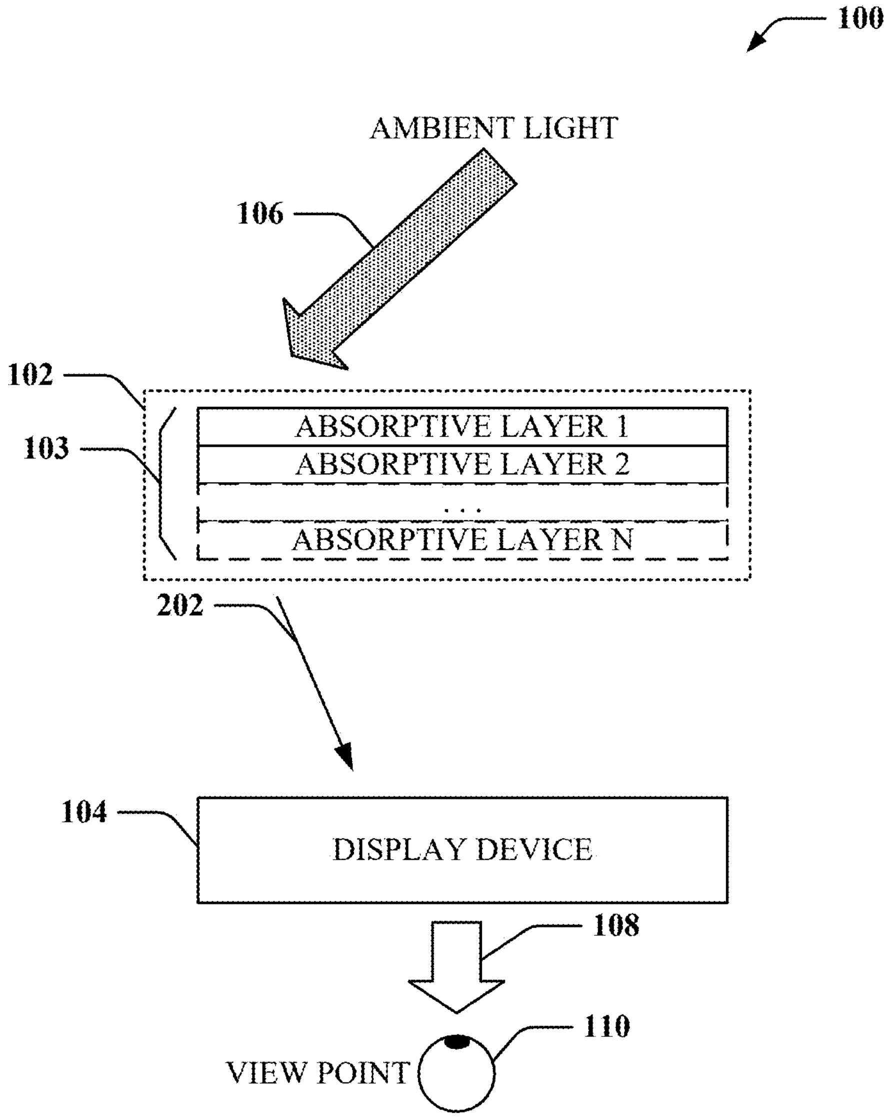
FIG. 2 is a system level block diagram of an example of the system that includes or can use the chromatically adaptive film for dynamically absorbing a controllable amount of one or more colors from light transmittance relative to a display device to absorb diffracted stray light, in accordance with aspects described herein.

FIG. 2 is a system level block diagram of an example of the system 100 that includes or can use the chromatically adaptive film 102 for dynamically absorbing a controllable amount of one or more colors from light transmittance relative to a display device 104 to absorb diffracted stray light, in accordance with aspects described herein. The display device 104, as described in FIG. 1 above, can include a waveguide properties or diffraction effects. For example, a lens of the display device 104 can be or can include a diffractive waveguide. The ambient light 106 may be diffracted by the waveguides into another angle, such a stray light 202, which may include diffraction into different colors, into the eye (e.g., at view point 110). In this example, the chromatically adaptive film 102 can also absorb the ambient light 106, as described above, to also reduce the stray light 202 diffracted from the ambient light 106.

Figure 3:
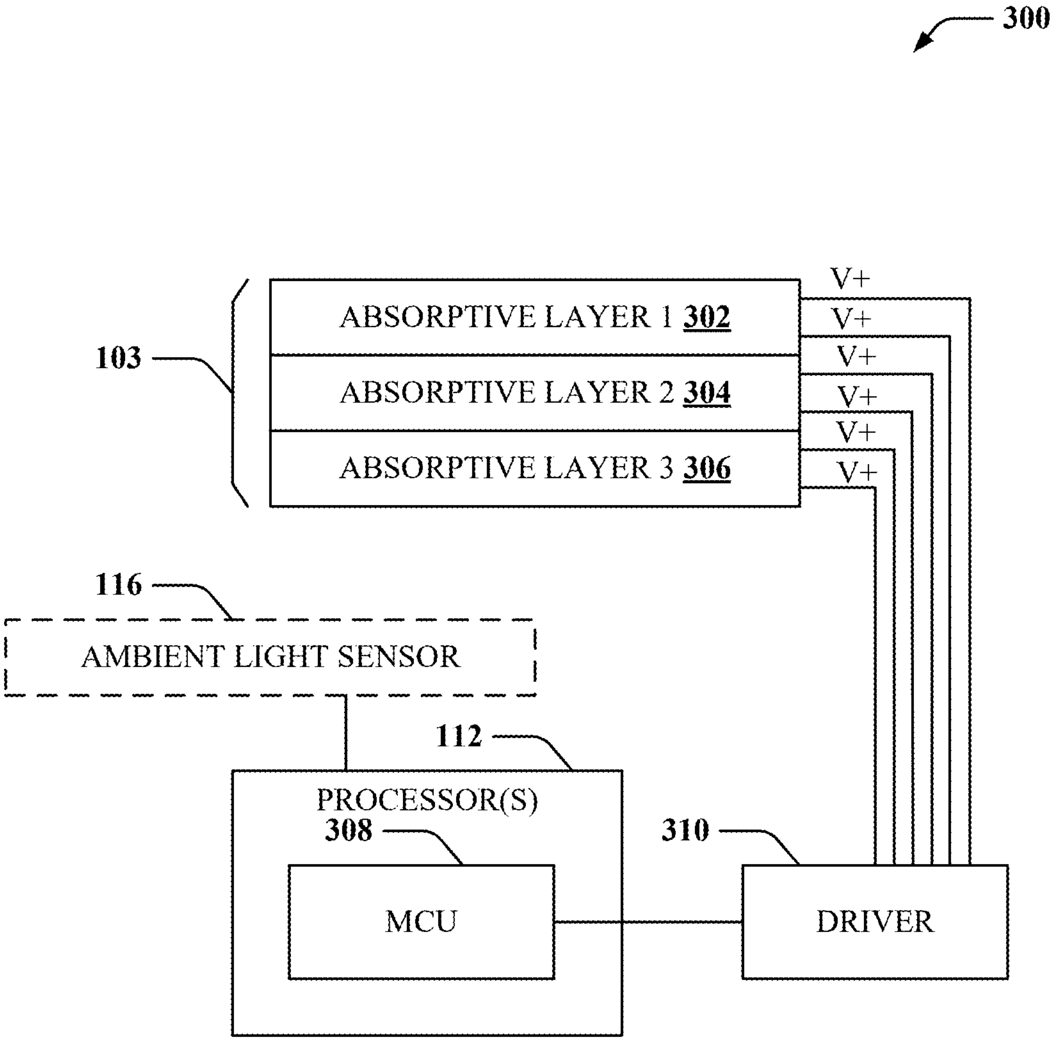
FIG. 3 is a system level block diagram of an example of a chromatically adaptive film operated by driving voltage to one or more of the multiple absorptive layers of the chromatically adaptive film, in accordance with aspects described herein.

FIG. 3 is a system level block diagram of an example of a chromatically adaptive film 300 operated by driving voltage to one or more of the multiple absorptive layers 103 of the chromatically adaptive film 300, in accordance with aspects described herein. Chromatically adaptive film 300 can be the same as or similar to chromatically adaptive film 102, and is one example of a specific implementation of chromatically adaptive film 102. For example, chromatically adaptive film 300 can activate color absorption for absorbing ambient light or leakage light in one or more of the multiple absorptive layers 103 by applying a voltage on the one or more of the multiple absorptive layers 103. In one example, the multiple absorptive layers 103 can include three absorptive layers-absorptive layer 1 302, absorptive layer 2 304, and absorptive layer 3 306. In a specific example, absorptive layer 1 302 can have a red dye, absorptive layer 2 304 can have a green dye, and absorptive layer 3 306 can have a blue dye, which can be effective for absorbing colors in ambient light for a RGB display. In other examples, the absorptive layers 302, 304, and 306 may have other color dyes, such as cyan, purple, and yellow, for absorbing such colors from ambient light or leakage light. In another example, a single absorptive layer with multiple color dyes can be used.

Processor(s) 112 can include, or can otherwise provide, a microcontroller control unit (MCU) 308 for controlling a driver 310 for providing output signals to drive voltage to the absorptive layers 302, 304, and 306 of the chromatically adaptive film 300. The driver 310 can include a regulator, an H-bridge, or substantially any electronic device that supply voltage from a power source (not shown for ease of explanation) to one or more components, such as color absorption layers of a chromatically adaptive film. For example, MCU 308 can determine an amount of color absorption to apply to one or more of the multiple absorptive layers 103, or a corresponding amount of voltage to signal, for providing to the one or more of the multiple absorptive layers 103, and can supply the corresponding voltage to the driver 310 or otherwise indicate the desired voltage to the driver 310. The driver 310 can apply the voltage(s) to the corresponding one or more of the multiple absorptive layers 103, which may include supplying a voltage signal (V+) to different electrodes (e.g., a positive electrode and a negative electrode) of each of the one or more of the absorptive layers. For example, where a single absorptive layer with multiple dyes is used, the single absorptive layer can include a single set of one or more electrodes for supplying voltage thereto. In an example, the driver 310 can apply different voltage to each absorptive layer to achieve a certain color absorption. In this regard, for example, MCU 308 can provide a voltage, or a signal to generate a voltage signal, to the driver 310, which can generate the voltage signal for providing to the one or more of the multiple absorptive layers 103. For example, MCU 308 can indicate an amount of voltage to be applied to the one or more of the multiple absorptive layers 103, a light transmittance desired based on the measured amount, or color profile, of ambient light or leakage light, which the driver 310 can convert to a voltage to achieve the light transmittance at the one or more of the multiple absorptive layers 103, and/or the like.

In one example, the voltage (or amount of absorption) for each color absorptive layer can be a function of an amount, or color profile, of ambient light measured by the ALS 116 (and communicated from the ALS 116 to the MCU 308), or leakage light based on information regarding an image displayed on the display device 104. In another example, the voltage (or amount of absorption) for each color absorptive layer can be a function of one or more selectable absorption level parameters corresponding to one or more of the colors of the multiple absorptive layers 103. In yet another example, the voltage (or amount of absorption) for each color absorptive layer can be a function of one or more colors determined from an image being displayed on the display device 104. In another example, the voltage (or amount of absorption) for each color absorptive layer can be determined based on a combination of such factors. In an example, the MCU 308 can store a look-up table for mapping one or more of an amount, or color profile, of ambient light, one or more selectable absorption level parameters, and/or colors in an image being displayed to corresponding absorption levels and/or voltages to achieve the absorption levels. MCU 308, in conjunction with driver 310 or otherwise, can determine the absorption levels and/or voltages to achieve the absorption levels based on the look-up table, and can send the appropriate information on the absorption level, or the voltage signal, to the driver 310, to cause the driver 310 to supply the driving voltage to one or more of the multiple absorptive layers 103.

In one example, driver 310 can supply the same voltage to each of the multiple absorptive layers 103 to achieve an overall dimming setting, or percentage of light transmission through the chromatically adaptive film 102. In another example, driver 310 can supply different voltages (based on instructions from the MCU 308) to one or more of the multiple absorptive layers 103 to achieve different color absorption effects. In a specific example, a color profile of the ambient light can be considered in determining different amounts of absorption to apply for each color absorptive layer in the multiple absorptive layers 103. In an example, artic, desert, and jungle environments can produce significantly different ambient light color profiles. For example, the artic environment may include more blue ambient light than other environments, the desert environment may include more red ambient light than other environments, and the jungle environment may include more green ambient light than other environments. Based on the color profile of the ambient light, for example, MCU 308 can determine to adjust absorption of one or more of the absorptive color layers. For example, for an artic environment exhibiting more blue color ambient light, MCU 308 can determine to adjust absorption of the blue color absorptive layer to filter more blue light in the artic environment with less absorption for the red and green color absorptive layers.

In another example, color profile of an image for display on the display device can be additionally or alternatively considered in determining which of the absorptive layers to activate to absorb the color in the ambient light and/or to reduce the leakage light to the outside world. For example, where the image has a significant amount of blue color, MCU 308 can determine to adjust absorption of the blue color absorptive layer (and/or of the red and green absorptive layers) to filter out more blue light than red or green light.

Figure 4:
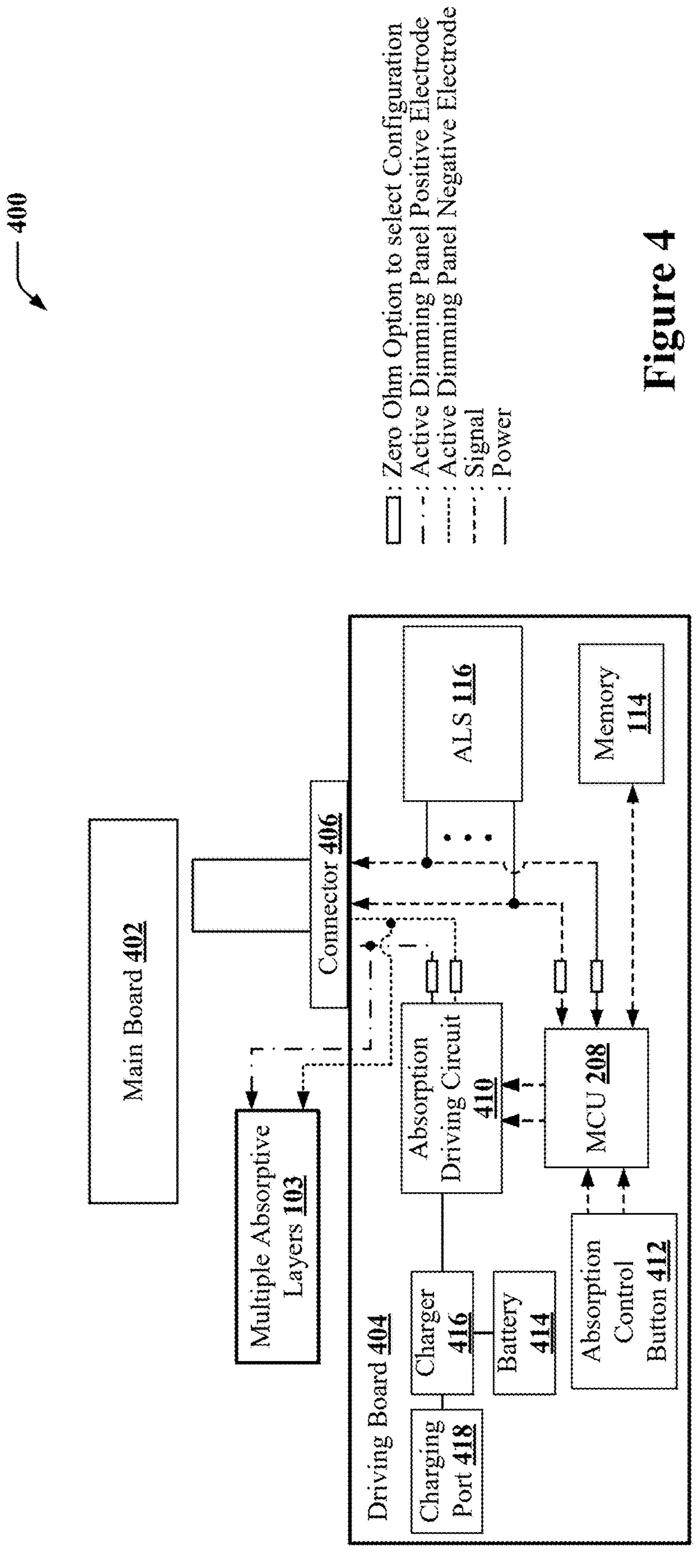
FIG. 4 is a block diagram of an example of a chromatically adaptive film control architecture for use with a display device, in accordance with aspects described herein.

FIG. 4 is a block diagram of an example of a chromatically adaptive film control architecture 400 for use with a display device, in accordance with aspects described herein. Architecture 400 includes a main board 402, to which a driving board 404 can be communicatively coupled via a connector 406. Main board 402 may also be coupled with one or more other processors (not shown), which may provide other functions described herein. Driving board 404 can include an MCU 308 for driving an absorption driving circuit 410, which may be similar to driver 310 described herein, for driving voltage to the multiple absorptive layers 103. Driving board 404 can include memory 114 for storing instructions for generating power control signals for providing to the absorption driving circuit 410. Driving board 404 can also include an absorption control button 412 for allowing a user to set an absorption level (a selectable absorption level parameter) for one or more colors that correspond to the colors of the multiple absorptive layers 103. Driving board 404 can also include power-related components, such as a battery 414 for powering the driving board, a charger 416 for charging the battery 414, and/or a charging port 418 for providing power to the charger 416.

In accordance with aspects described herein, for example, memory 114 can store instructions for generating power control signals for providing to the absorption driving circuit 410 based on an amount, or color profile, of ambient light, one or more selectable absorption level parameters, a value of which can be specified by the absorption control button 412, and/or colors associated with an image to be displayed on a display device. For example, MCU 308 can receive a measured amount, or measured color profile, of ambient light having varying spectral content from the ALS 116. MCU 308 can refer to a look-up table stored in memory 114 to determine an amount of color absorption to apply to each of the multiple absorptive layers 103, and can accordingly drive the absorption driving circuit 410 to provide a corresponding voltage to each of the multiple absorptive layers 103. An example of a look-up tables are shown in FIG. 5.

FIG. 5 is an example of look-up tables 500 and 502 for mapping an amount of ambient light to a dimming setting and/or display brightness for a display device, in accordance with aspects described herein. For example, look-up table 500 includes tables for achieving different contrast ratios (CR), such as CR>5:1 in look-up table 500 or CR>3:1 in look-up table 502. In an example, the chromatically adaptive film 102 can allow for indicating a desired CR (e.g., as a selectable parameter by software configuration, hardware switch, etc.), and MCU 308 can accordingly determine which look-up table 500 or 502 to select for mapping an amount of ambient light to a corresponding absorption level (or dimming) and/or a display brightness. For example, given an amount of ambient light measured by ALS 116, MCU 308 can determine, for a desired hologram CR (which is the CR desired for displaying an image on the display at the given ambient light level), a dimming setting (% transmission) that corresponds to the ALS 116 measurement. MCU 308 can accordingly send a power control signal to the absorption driving circuit 410 to achieve the dimming setting. For example, the dimming setting in this example can refer to a uniform amount of absorption (and/or a uniform corresponding voltage) to apply to each of the multiple absorptive layers 103. In addition, MCU 308 can determine a display brightness for the desired hologram CR that corresponds to the ALS 116 measurement and can accordingly adjust the display brightness for further power savings in the display device.

Referring back to FIG. 4, as described, absorption driving circuit 410 can apply, to each layer, a voltage on a corresponding positive and negative electrode (e.g., to achieve a forward and reverse voltage bias over time). In addition, in an example, the display device can reduce a brightness level of the display based on the color absorption being applied to reduce power consumption by the display device.

Figure 6:
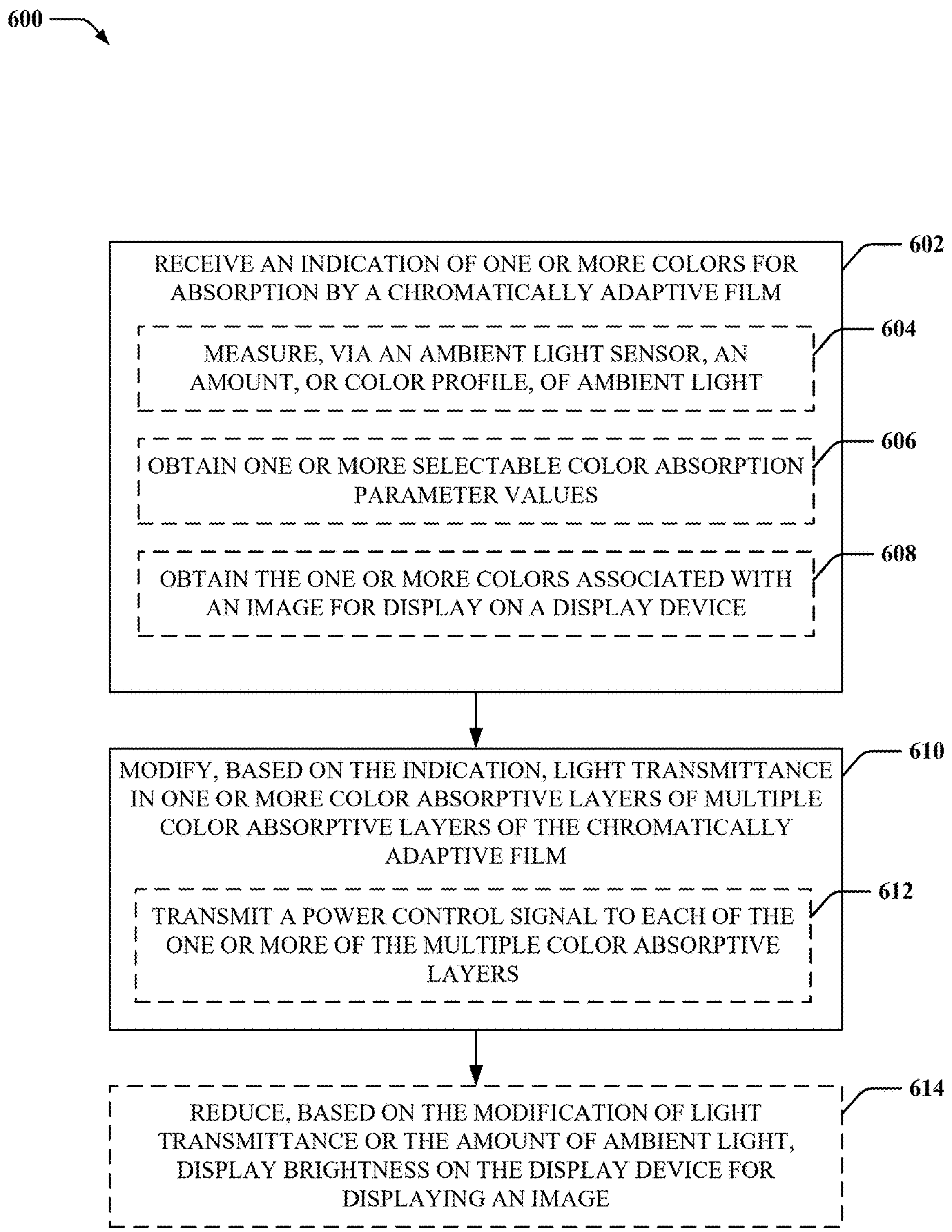
FIG. 6 is a flowchart of an example of a method for operating a chromatically adaptive film, in accordance with aspects described herein.

FIG. 6 is a flowchart of an example of a method 600 for operating a chromatically adaptive film, in accordance with aspects described herein. For example, method 600 can be performed by a chromatically adaptive film 102 and/or one or more components thereof to facilitate absorbing colors by one or more color absorptive layers of multiple color absorptive layers, as described herein.

In method 600, at action 602, an indication of one or more colors for absorption by a chromatically adaptive film can be received. In an example, processor(s) 112, MCU 308, e.g., in conjunction with memory/memories 114, etc., can receive the indication of the one or more colors for absorption by the chromatically adaptive film 102. In one example, the indication can include a measurement of ambient light or leakage light, such as a measurement of illuminance (e.g., lux), color temperature, color profile, etc. In one example, optionally at action 604, an amount, or color profile, of ambient light can be measured via an ambient light sensor. In an example, processor(s) 112, MCU 308, e.g., in conjunction with memory/memories 114, etc., can measure, via the ALS (e.g., ALS 116, which may be coupled with the MCU 308 or other component of the chromatically adaptive film 102), the amount, or color profile, of the ambient light.

In another example, optionally at action 606, one or more selectable color absorption parameter values can be obtained. In an example, processor(s) 112, MCU 308, e.g., in conjunction with memory/memories 114, etc., can obtain the one or more selectable color absorption parameter values. For example, processor(s) 112 or MCU 308 can obtain the one or more values based on an absorption control button 412 setting, or other hardware selection component (e.g., a multi-position button, dial, switch, etc. that can be used to indicate a value of a selectable color absorption parameter). In another example, processor(s) 112 or MCU 308 can obtain the one or more values from a software configuration stored in memory 114 of the chromatically adaptive film 102, where the software configuration may be modified by a user using one or more interfaces. For example, whether selectable by hardware or software configuration, the selectable color absorption parameters may be specified per color (e.g., a parameter for each color) or may be one parameter for all colors (e.g., for an overall dimming effect).

In another example, optionally at action 608, one or more colors associated with an image for display on a display device can be obtained. In an example, processor(s) 112, MCU 308, e.g., in conjunction with memory/memories 114, etc., can obtain the one or more colors associated with the image for display on the display device 104. In an example, processor(s) 112 or MCU 308 can obtain the indication of the one or more colors associated with the image from an application operating on the display device 104, from a driver for the display of the display device 104 that can send color signals to the display to cause display of the image, and/or the like. The indication can include an indication of multiple color wavelengths for each pixel in the image (or each pixel in a foreground or other portion of the image), an average for all pixels in the image (or each pixel in a foreground or other portion of the image), a proportion of each color for all pixels in the image (or each pixel in a foreground or other portion of the image), and/or the like. As described, for example, the colors (or multiple color wavelengths) can include the primary colors used for the display, such as red, green, and blue, and the indication can include a measure of density of each color in the pixels of the image. In one example, information regarding the one or more colors associated with the image can assist in determining which colors to absorb from ambient light to achieve a desired light transmittance for viewing the image on the display device 104. In another example, information regarding the one or more colors associated with the image can enable absorbing leakage light from the display device 104 to reduce world-side leakage.

In method 600, at action 610, light transmittance in one or more color absorptive layers of multiple color absorptive layers of the chromatically adaptive film can be modified based on the indication. In an example, processor(s) 112, MCU 308, e.g., in conjunction with memory/memories 114, driver 310, etc., can modify, based on the indication, light transmittance in one or more color absorptive layers of multiple color absorptive layers (e.g., multiple absorptive layers 103 each corresponding to a different color) of the chromatically adaptive film 102. For example, processor(s) 112 or MCU 308 can individually modify each of the multiple color absorptive layers based on the indication to absorb a portion of a corresponding color from the ambient light or leakage light. In one example, as described, processor(s) 112 or MCU 308 can individually modify each of the multiple color absorptive layers based on a color profile of the ambient light or leakage light to absorb certain colors from the ambient light or leakage light (e.g., colors having a larger color value, e.g., more density, than other colors in the ambient light or leakage light). In another example, as described, processor(s) 112 or MCU 308 can individually modify each of the multiple color absorptive layers based on a uniform absorption to substantially equally absorb the light at each color absorptive layer to provide an overall dimming effect.

Processor(s) 112 or MCU 308 can determine an amount of absorption to apply at each of the multiple absorptive layers 103 based on the indication, and may modify the light transmittance based on the determined amount. For example, processor(s) 112 or MCU 308 can determine the amount of absorption or the amount of light transmittance for each of multiple absorptive layers 103, which may be based on a uniform amount or determining a proportion of each color in the ambient light, a selectable color absorption parameter per color (or otherwise), a proportion of each color in an image being displayed on the display device 104, etc. In an example, based on the amount, or color profile, of light, processor(s) 112 or MCU 308 can determine the amount of absorption or light transmittance to achieve a certain (e.g., configurable) contrast ratio, which may include mapping the amount, or color profile, of light to the amount of absorption or light transmittance in a look-up table.

In an example, optionally at action 612, a power control signal can be transmitted to each of the one or more of the multiple color absorptive layers. In an example, processor(s) 112, MCU 308, e.g., in conjunction with memory/memories 114, driver 310, etc., can transmit the power control signal to each of the one or more of the multiple color absorptive layers. Processor(s) 112 or MCU 308, or driver 310, can determine an amount of voltage for the power control signal to achieve the determined amount of color absorption, or light transmittance, in each of the multiple absorptive layers 103, and can send a separate power control signal to each of the multiple absorptive layers 103 to achieve the amount of color absorption or light transmittance. In one example, driver 310 can send the power control signal as a voltage on different electrodes of a color absorptive layer over time to achieve a forward and/or reverse bias.

In method 600, optionally at action 614, display brightness on the display device for displaying an image can be reduced based on the modification of light transmittance or the amount of ambient light. In an example, processor(s) 112, MCU 308, e.g., in conjunction with memory/memories 114, driver 310, etc., can reduce, based on the modification of light transmittance or the amount of ambient light, display brightness on the display device 104 for displaying the image. For example, processor(s) 112 or MCU 308 can determine an amount of brightness correlated to the amount of light transmittance (or color absorption) or the measured amount of ambient light, which may also be based on using a look-up table to map the display brightness to the amount of light transmittance (or color absorption) or the measured amount of ambient light. Processor(s) 112 or MCU 308 can accordingly instruct the display device 104 to adjust the display brightness to a value determined from the amount of light transmittance (or color absorption) or the measured amount of ambient light.

Some further example aspects are provided below.

Aspect 1 is a method for controlling a chromatically adaptive film for a display device including receiving an indication of one or more colors for absorption by the chromatically adaptive film, and modifying, based on the indication, light transmittance in one or more color absorptive layers of multiple color absorptive layers of the chromatically adaptive film.

In Aspect 2, the method of Aspect 1 includes where the indication indicates each of the one or more colors and a level of absorption for the one or more colors, where modifying the light transmittance is based on the level of absorption.

In Aspect 3, the method of any of Aspects 1 or 2 includes where modifying the light transmittance includes transmitting a power control signal to each of the one or more of the multiple color absorptive layers.

In Aspect 4, the method of Aspect 3 includes where a voltage corresponding to the power control signal for a given layer of the multiple color absorptive layers is a function of a level of absorption specified for a color associated with the given layer.

In Aspect 5, the method of any of Aspects 1 to 4 includes where the multiple color absorptive layers include one layer for each of multiple primary color wavelengths used by the display device to display images.

In Aspect 6, the method of any of Aspects 1 to 5 includes where the indication of one or more colors is based on one or more selectable absorption level parameters.

In Aspect 7, the method of any of Aspects 1 to 6 includes where the indication of one or more colors is based on an image displayed on the display device.

In Aspect 8, the method of any of Aspects 1 to 7 includes receiving the indication as one or more colors in an amount of ambient light measured by a ambient light sensor.

In Aspect 9, the method of Aspect 8 includes reducing, based on the modification of light transmittance or the amount of ambient light, display brightness on the display device for displaying an image.

In Aspect 10, the method of any of Aspects 1 to 9 includes where the indication indicates a uniform color absorption for the one or more colors based on an amount of ambient light.

Aspect 11 is an apparatus for controlling a display device including one or more processors configured to receive an indication of one or more colors for absorption by a chromatically adaptive film of the display device, and modify, based on the indication, light transmittance in one or more color absorptive layers of multiple color absorptive layers of the chromatically adaptive film.

In Aspect 12, the apparatus of Aspect 11 includes where the indication indicates each of the one or more colors and a level of absorption for the one or more colors, wherein the one or more processors are configured to modify the light transmittance based on the level of absorption.

In Aspect 13, the apparatus of any of Aspects 11 or 12 includes where the one or more processors are configured to modify the light transmittance by transmitting a power control signal to each of the one or more color absorptive layers of the multiple color absorptive layers.

In Aspect 14, the apparatus of Aspect 3 includes where a voltage corresponding to the power control signal for a given layer of the multiple color absorptive layers is a function of a level of absorption specified for a color associated with the given layer.

In Aspect 15, the apparatus of any of Aspects 11 to 14, where the multiple color absorptive layers include one layer for each of multiple primary color wavelengths used by the display device to display images.

In Aspect 16, the apparatus of any of Aspects 11 to 5 includes where the indication of one or more colors is based on one or more selectable absorption level parameters.

In Aspect 17, the apparatus of any of Aspects 11 to 16 includes where the indication of one or more colors is based on an image displayed on the display device.

In Aspect 18, the apparatus of any of Aspects 11 to 17 includes an ambient light sensor, where the one or more processors are configured to receive the indication as one or more colors in an amount of ambient light measured by the ambient light sensor.

In Aspect 19, the apparatus of Aspect 18 includes where the one or more processors are further configured to reduce, based on the modifying of light transmittance or the amount of ambient light, display brightness on the display device for displaying an image.

In Aspect 20, the apparatus of any of Aspects 11 to 19 includes where the indication indicates a uniform color absorption for the one or more colors based on an amount of ambient light.

Aspect 21 is an apparatus including one or more processors, one or more memories coupled with the one or more processors, and instructions stored in the one or more memories and operable, when executed by the one or more processors, to cause the apparatus to perform any of the methods of Aspects 1 to 10.

Aspect 22 is an apparatus for including means for performing any of the methods of Aspects 1 to 10.

Aspect 23 is one or more computer-readable media including code executable by one or more processors, the code including code for performing any of the methods of Aspects 1 to 10.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium, such as a non-transitory computer-readable medium. Computer-readable media includes computer storage media. Storage media may be any available media that can be accessed by a computer. By way of example, and not limitation, such computer-readable media can comprise random access memory (RAM), read only memory (ROM), electrically erasable programmable ROM (EEPROM), CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for controlling a display device, comprising:
- one or more processors configured to:
  - receive an indication of one or more colors for absorption by a chromatically adaptive film overlaid on, or situated within, the display device to control one of ambient light transmitted through the display device when displaying an image or leakage light transmitted from the display device when displaying an image; and
  - modify, based on the indication, light transmittance in one or more color absorptive layers of multiple color absorptive layers within the chromatically adaptive film.

2. The apparatus of claim 1, wherein the indication indicates each of the one or more colors and a level of absorption for the one or more colors, wherein the one or more processors are configured to modify the light transmittance based on the level of absorption.

3. The apparatus of claim 1, wherein the one or more processors are configured to modify the light transmittance by transmitting a power control signal to each of the one or more color absorptive layers of the multiple color absorptive layers.

4. The apparatus of claim 3, wherein a voltage corresponding to the power control signal for a given layer of the multiple color absorptive layers is a function of a level of absorption specified for a color associated with the given layer.

5. The apparatus of claim 1, wherein the multiple color absorptive layers include one layer for each of multiple primary color wavelengths used by the display device to display the image.

6. The apparatus of claim 1, wherein the indication of one or more colors is based on one or more selectable absorption level parameters.

7. The apparatus of claim 1, wherein the indication of one or more colors is based on the image displayed on the display device.

8. The apparatus of claim 1, further comprising an ambient light sensor, wherein the one or more processors are configured to receive the indication as one or more colors in an amount of ambient light measured by the ambient light sensor.

9. The apparatus of claim 8, wherein the one or more processors are further configured to reduce, based on the modifying of light transmittance or the amount of ambient light, display brightness on the display device for displaying the image.

10. The apparatus of claim 1, wherein the indication indicates a uniform color absorption for the one or more colors based on an amount of ambient light.

11. A method for controlling a display device, comprising:

receiving an indication of one or more colors for absorption by a chromatically adaptive film overlaid on, or situated within, the display device to control one of ambient light transmitted through the display device when displaying an image or leakage light transmitted from the display device when displaying an image; and transmitting a power control signal to each of one or more color absorptive layers of multiple color absorptive layers within the chromatically adaptive film to modify, based on the indication, light transmittance in each of the one or more color absorptive layers.

12. The method of claim 11, wherein the indication indicates each of the one or more colors and a level of absorption for the one or more colors, wherein modifying the light transmittance is based on the level of absorption.

13. The method of claim 11, wherein modifying the light transmittance includes transmitting a power control signal to each of the one or more color absorptive layers of the multiple color absorptive layers.

14. The method of claim 13, wherein a voltage corresponding to the power control signal for a given layer of the multiple color absorptive layers is a function of a level of absorption specified for a color associated with the given layer.

15. The method of claim 11, wherein the multiple color absorptive layers include one layer for each of multiple primary color wavelengths used by the display device to display the image.

16. The method of claim 11, wherein the indication of one or more colors is based on one or more selectable absorption level parameters.

17. The method of claim 11, wherein the indication of one or more colors is based on the image displayed on the display device.

18. The method of claim 11, further comprising:

receiving the indication as one or more colors in an amount of ambient light measured by a ambient light sensor; and reducing, based on the modifying of light transmittance or the amount of ambient light, display brightness on the display device for displaying the image.

19. The method of claim 11, wherein the indication indicates a uniform color absorption for the one or more colors based on an amount of ambient light.

20. A non-transitory computer-readable device storing instructions thereon that, when executed by a computing device, cause the computing device to perform operations for controlling a chromatically adaptive film overlaid on, or situated within, a display device, comprising:

receiving an indication of one or more colors for absorption by the chromatically adaptive film to control one of ambient light transmitted through the display device when displaying an image or leakage light transmitted from the display device when displaying an image; and transmitting a power control signal to each of one or more color absorptive layers of multiple color absorptive layers within the chromatically adaptive film to modify, based on the indication, light transmittance in each of the one or more color absorptive layers.

* * * * *